United States Patent
Wagener et al.

(10) Patent No.: US 7,574,078 B2
(45) Date of Patent: Aug. 11, 2009

(54) RECONFIGURABLE OPTICAL SWITCH

(75) Inventors: Jefferson L. Wagener, New Hope, PA (US); Christopher S. Koeppen, New Hope, PA (US); Allan Schweitzer, Plainsboro, NJ (US); Thomas Andrew Strasser, Warren, NJ (US)

(73) Assignee: Meriton Networks US Inc., Wilmington, DE (US)

( * ) Notice: Subject to any disclaimer, the term of this patent is extended or adjusted under 35 U.S.C. 154(b) by 0 days.

(21) Appl. No.: 10/870,326

(22) Filed: Jun. 17, 2004

(65) Prior Publication Data

US 2007/0003186 A1 Jan. 4, 2007

Related U.S. Application Data

(63) Continuation of application No. 09/691,812, filed on Oct. 19, 2000, now abandoned, which is a continuation-in-part of application No. 09/571,833, filed on May 16, 2000, now Pat. No. 6,631,222.

(51) Int. Cl.
*G02B 6/26* (2006.01)
(52) U.S. Cl. .......................................... 385/17; 385/16
(58) Field of Classification Search ........................ None
See application file for complete search history.

(56) References Cited

U.S. PATENT DOCUMENTS

| | | | |
|---|---|---|---|
| 4,244,045 | A | 1/1981 | Nosu et al. |
| 4,626,066 | A | 12/1986 | Levinson |
| 5,479,082 | A | 12/1995 | Calvani et al. |
| 5,504,827 | A | 4/1996 | Schimpe |
| 5,583,683 | A | 12/1996 | Scobey |
| 5,612,805 | A | 3/1997 | Fevrier et al. |

(Continued)

FOREIGN PATENT DOCUMENTS

JP 60-88907 5/1985

OTHER PUBLICATIONS

E. Murphy, Optical Fiber Telecommunications IIIB, Chapter 10, ed. T. Koch and I. Kaminow, Academic Press, 1997.

(Continued)

*Primary Examiner*—Sung H Pak
(74) *Attorney, Agent, or Firm*—Mayer & Williams PC; Stuart H. Mayer, Esq.; Karin L. Williams, Esq.

(57) ABSTRACT

An optical switch is provided which includes a plurality of input/output ports for receiving one or more wavelength component(s) of an optical signal. The optical switch also includes an optical arrangement that directs the wavelength component to any given one of the plurality of input/output ports. The given input/output port may be selected from among any of the plurality of input/output ports. If the optical signal includes a plurality of wavelength components, the optical arrangement includes at least one wavelength selective element such as a thin film filter. The wavelength selective element selects one of the wavelength components from among the plurality of wavelength components. The optical arrangement also includes a plurality of optical elements each associated with one of the wavelength selective elements. Each of the optical elements direct the selected wavelength component, which is selected by its associated selective element, to a given one of the plurality of input/output ports independently of every other wavelength component. The optical elements may be tiltable retroreflective mirror assemblies.

62 Claims, 8 Drawing Sheets

BIDIRECTIONAL INPUTS/OUTPUTS WITH
INDEPENDENT WAVELENGTH DISTRIBUTION

U.S. PATENT DOCUMENTS

| | | |
|---|---|---|
| 5,621,829 A | 4/1997 | Ford |
| 5,808,763 A | 9/1998 | Duck et al. |
| 5,835,517 A | 11/1998 | Jayaraman et al. |
| 5,841,917 A | 11/1998 | Jungerman et al. |
| 5,915,050 A | 6/1999 | Russell et al. |
| 5,920,411 A | 7/1999 | Duck et al. |
| 5,959,749 A | 9/1999 | Danagher et al. |
| 5,960,133 A | 9/1999 | Tomlinson |
| 5,974,207 A | 10/1999 | Aksyuk et al. |
| 6,005,993 A | 12/1999 | MacDonald |
| 6,008,920 A | 12/1999 | Hendrix |
| 6,028,689 A | 2/2000 | Michalicek et al. |
| 6,075,632 A | 6/2000 | Braun |
| 6,289,148 B1 | 9/2001 | Lin et al. |
| 6,327,398 B1 | 12/2001 | Solgaard et al. |
| 6,501,877 B1 * | 12/2002 | Weverka et al. ............... 385/31 |

OTHER PUBLICATIONS

C.R. Doerr, "Proposed WDM Cross Connect Using a Planar Arrangement of Waveguide Grating Routers and Phase Shifters," Photonics Technology Letters, vol. 10, No. 4, Apr. 1998.

C.R. Giles et al., "Low-Loss ADD/DROP Multiplexers for WDM Lightwave Networks," Tenth International Conference on Integrated Optics and Optical Fibre Communication, IOOC, vol. 3, Jun. 29, 1995.

JDS Uniphase Corporation, Add-Drop Modules, Product Bulletin 2000, Ontario, Canada.

D.O. Culverhouse et al., "Low-loss all-fiber acousto-optic tunable filter," Optical Society of America, vol. 22, No. 2, Jan. 15, 1997, pp. 96-98.

Roberto Sabella et al., "Impact of Transmission Performance on Path Routing in All-Optical Transport Networks," Journal of Lightwave Technology, vol. 16, No. 11, Nov. 1998, pp. 1965-1971.

* cited by examiner

REFLECTED TRANSLATION OF A
COLLIMATED BEAM WITH A TILT MIRROR

BIDIRECTIONAL INPUTS/OUTPUTS WITH INDEPENDENT WAVELENGTH DISTRIBUTION

SWITCHING FABRIC USED IN FIG. 1
TO ACHIEVE DESIRED FUNCTIONALITY
WITH CONVENTIONAL SWITCHES

EXTENDED WAVELENGTH FABRIC WITH BANDED STRUCTURE

BIDIRECTIONAL INPUTS/OUTPUTS WITH
INDEPENDENT WAVELENGTH
DISTRIBUTION IN CIRCULAR GEOMETRY

RECONFIGURABLE OPTICAL SWITCH

STATEMENT OF RELATED APPLICATIONS

This application is a continuation and claims the benefit of priority of U.S. application Ser. No. 09/691,812 entitled "A Reconfigurable Optical Switch," filed in the United States Patent and Trademark Office on Oct. 19, 2000 now abandoned, which is a continuation-in-part of U.S. patent application Ser. No. 09/571,833, entitled "A Reconfigurable Optical Switch," filed in the United States Patent and Trademark Office on May 16, 2000, now U.S. Pat. No. 6,631,222. Both of the aforementioned priority applications are incorporated by reference in their entirety herein.

FIELD OF THE INVENTION

The invention relates generally to an optical communications system and more particularly to an optical switch for flexibly routing light in a wavelength-selective manner.

BACKGROUND OF THE INVENTION

Significant interest exists in multi-wavelength communication systems, which are typically referred to as Wavelength Division Multiplexed (WDM) systems. These systems use a WDM optical signal having different wavelength components that support different streams of information. While WDM systems were initially investigated to increase the information capacity that a fiber could transmit between two points, recent improvements in optical filtering technology, among other things, has led to the development of switching elements which allow a complex network of paths to be constructed that differ from wavelength to wavelength. Furthermore, in addition to the availability of wavelength dependent switching elements in which a given wavelength is routed along a given path, reconfigurable optical elements have become available. Such reconfigurable optical elements can dynamically change the path along which a given wavelength is routed to effectively reconstruct the topology of the network as necessary to accommodate a change in demand or to restore services around a network failure.

Examples of reconfigurable optical elements include Optical Add/Drop Multiplexers (OADM) and Optical Cross-Connects (OXC). OADMs are used to separate or drop one or more wavelength components from a WDM signal, which is then directed onto a different path. In some cases the dropped wavelengths are directed onto a common fiber path and in other cases each dropped wavelength is directed onto its own fiber path. OXCs are more flexible devices than OADMs, which can redistribute in virtually any arrangement the components of multiple WDM input signals onto any number of output paths.

The functionality of the previously mentioned reconfigurable optical elements can be achieved with a variety of different devices. For example, a common approach employs any of a number of different broadband switching fabrics inserted between a pair of demultiplexers/multiplexers. Examples of OADM elements are disclosed in U.S. Pat. Nos. 5,504,827, 5,612,805, and 5,959,749, and general OXC switching architecture is reviewed by E. Murphy in chapter 10 of *Optical Fiber Telecommunications IIIB*, edited by T. Koch and I. Kaminow. As shown in these references, these approaches sequentially demultiplex the wavelengths, perform the necessary switching and then remultiplex, where the OXC can direct a given wavelength onto any output because a conventional OXC uses a relatively complex M×M device for the switching fabric, while OADMs are less flexible due to their use of an array of 2×2 optical switches that can only direct between one of two outputs. Two alternate approaches to OADMs employ switchable mirrors effectively inserted between a device that simultaneously performs wavelength demultiplexing and multiplexing. The first of these approaches uses a thin film dielectric demultiplexer/multiplexer that is traversed twice by the wavelengths (e.g., U.S. Pat. No. 5,974,207), while the second approach uses dispersion from a bulk diffraction grating to demultiplex (separate) the wavelength channels before they reflect off an array of tiltable mirrors (U.S. Pat. No. 5,960,133). Another set of OADM technologies employ 4-port devices that drop multiple wavelengths onto a single fiber output in a reconfigurable manner, and thus require an additional demultiplexer if the channels need to undergo broadband optoelectronic conversion at the receiver. One realization of such functionality uses fiber optic circulators added to a two-port version of the previously described diffraction grating demultiplexer and tiltable mirror array (Ford et al., Postdeadline papers LEOS '97, IEEE Lasers and Electro-Optics Society). A second realization uses integrated silica waveguide technology (e.g., Doerr, IEEE Phot. Tech. Lett '98) with thermo-optic phase shifters to switch between the add and drop states for each wavelength. Another four-port OADM employs a fiber optic circulator and an optional tunable fiber grating reflector to route the dropped channels (e.g., C. R. Giles, IOOC '95, JDS 2000 catalog)

All of the aforementioned conventional optical switching technologies have shortcomings. These devices generally fall into two classes with respect to their shortcomings: very flexible devices with high cost and high optical loss, and lower flexibility devices, which are less expensive and have lower optical loss. The most flexible OXCs can be programmed to switch the path of any of a large number of wavelengths, each onto its own fiber (e.g. demux/mux with switches), however these devices may have up to 20 dB of insertion loss and therefore require an optical amplifier to compensate for the loss. This substantially adds to the cost of an already expensive device. Because these devices are so costly, less flexible alternatives such as fiber gratings and thin film filters are often used. While these devices have a significantly lower cost and insertion loss (2-5 dB/node), they are typically less flexible because they are implemented as fixed wavelength OADMs that cannot be reconfigured. These devices are also inflexible because as you scale them so that they drop more wavelengths their loss, cost, size and/or complexity increase to the point that the more flexible OXC alternatives become more attractive. Recently, as shown in U.S. Pat. No. 5,479,082, some flexibility has been added to these lowest cost OADM devices so that they can selectively drop or pass a predetermined subset of wavelengths that was previously designated as fixed. In addition, the previously described reconfigurable OADM devices offer somewhat enhanced flexibility, but typically at the expense of higher insertion loss (for Demux/switches), limited wavelength resolution (for bulk grating approaches), and/or higher cost for additional Mux/Demux equipment used in connection with four-port devices.

One particular limitation of the conventional OXC and OADM approaches, which demultiplex the incoming signal before optical switching is performed, is that each output port can only drop a particular fixed wavelength that cannot be altered. In this configuration each switch is arranged so that it only receives a preselected wavelength component from the demultiplexer, and therefore can only output that particular wavelength. Unless subsequent optical switching is used, the flexibility of these devices is limited since it is not possible to redirect a given wavelength from one output port to another output port or to redirect multiple wavelengths to a given output port, should that become necessary. This is true not only for WDM switches but also broadband switches generally, including 1×M broadband switches such as shown in U.S. Pat. No. 5,621,829, for example. This functionality is desirable when a unique element within the network is accessible through a particular port, and it is desirable to (a) change the wavelength channel directed to that port, or (b) direct additional wavelengths over that particular fiber accessed via that port. Two situations where this functionality proves useful is when a link needs to be restored using an alternate wavelength, or when the information capacity directed to a specific port needs to be increased by adding additional WDM wavelengths down the same fiber.

Copending U.S. application Ser. No. 09/571,833 entitled "A Reconfigurable Optical Switch," filed in the U.S.P.T.O on May 16, 2000, discloses an optical switching element that achieves the previously mentioned functionality. That is, this switching element can direct each and every wavelength component of a WDM signal from any input port to any output port independently of one another. More specifically, this optical switch, similar to most current optical switches, provides an optical path between two subsets of the total optical ports, which are conventionally denoted "input" and "output" ports. This optical switch can only provide connections between the subset of input ports and the subset of output ports, or vice versa, but it cannot provide a connection between two ports within the same subset (either input or output). That is, in this switch, there are usually two distinct subset of ports; once light enters one subset, it must exit from the other subset. Unfortunately, this limitation prevents a wavelength component from being routed between two ports in the same subset of ports. Such a capability would be advantageous, for example, in bi-directional systems when a customer wishes to communicate between two premises by connecting through the output ports of a remote distribution node, thereby circumventing an unnecessary portion of the optical network. While it would be desirable to provide this functionality in a broadband, wavelength independent switch, it would be even more advantageous to provide such functionality for each and every wavelength of a WDM signal in a wavelength-dependent switch.

Accordingly, there is a need for an optical switching element in which each and every wavelength component can be directed from any given port to any other port without constraint.

SUMMARY OF THE INVENTION

In accordance with the present invention, an optical switch is provided which includes a plurality of input/output ports for receiving one or more wavelength component(s) of an optical signal. The optical switch also includes an optical arrangement that directs the wavelength component to any given one of the plurality of input/output ports. The given input/output port may be selected from among any of the plurality of input/output ports.

In accordance with one aspect of the invention, the optical arrangement retroreflects the wavelength component to the given input/output port.

In accordance with another aspect of the invention, the optical signal includes a plurality of wavelength components and the optical arrangement includes at least one wavelength selective element. The wavelength selective element selects one of the wavelength components from among the plurality of wavelength components. The optical arrangement also includes a plurality of optical elements each associated with one of the wavelength selective elements. Each of the optical elements direct the selected wavelength component, which is selected by its associated selective element, to a given one of the plurality of input/output ports independently of every other wavelength component.

In accordance with yet another aspect of the invention, the wavelength selective elements may be thin film filters each transmitting therethrough a different one of the wavelength components and reflecting the remaining wavelength components. Alternatively, the wavelength selective elements may be bulk diffraction gratings.

In accordance with another aspect of the invention, the optical elements are reflective mirrors that are selectively tiltable in a plurality of positions such that in each of the positions the mirrors reflect the wavelength component incident thereon to any selected one of the input/output ports.

In accordance with another aspect of the invention, the reflective mirrors are part of a micro-electromechanical (MEM) retroreflective mirror assembly. The retroreflective mirror assembly may include an aspheric lens or a curved reflector element.

In accordance with another aspect of the invention, the optical switch includes a free space region disposed between the input/output ports and the optical arrangement.

In accordance with another aspect of the invention, the free space region includes an optically transparent substrate having first and second parallel surfaces. In this case, the plurality of wavelength selective elements are arranged in first and second arrays which extend along the first and second parallel surfaces, respectively.

In accordance with yet another aspect of the invention, the first and second arrays are laterally offset with respect to one another. Each of the wavelength selective elements arranged in the first array direct the selected wavelength component to another of the wavelength selective elements arranged in the second array.

In accordance with yet another aspect of the invention, the optically transparent substrate may include air as a medium in which the optical signal propagates. Alternatively, the optically transparent substrate may be silica glass.

In accordance with another aspect of the invention, a method is provided for directing at least the first and second wavelength components of a WDM signal, which includes a plurality of wavelength components, from a first input/output port to any selected one of a plurality of input/output ports. The plurality of input/output ports includes the first input/output port. The method begins by receiving the WDM signal at the first input/output port. Next, the first wavelength component is selected from among the plurality of wavelength components. A given input/output port is selected from among any of the plurality of input/output ports. The first wavelength component is directed to the given input/output port. In addition, the second wavelength component is directed to another given one of the plurality of input/output ports, which is selected independently from the given input/output port to which the first wavelength component is directed.

DETAILED DESCRIPTION

Figure 1:
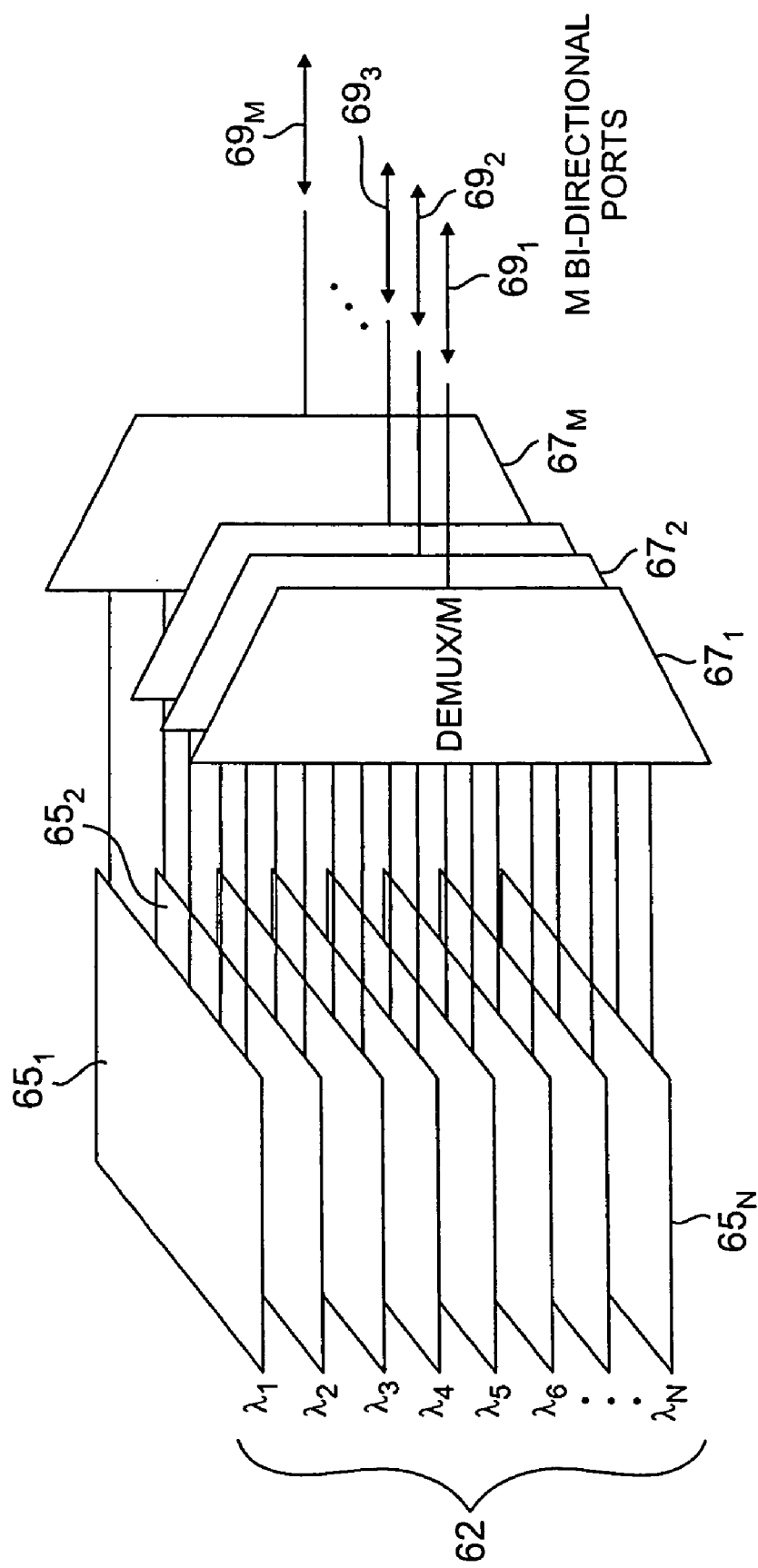
FIG. 1 shows the functionality to be achieved by an optical switching fabric constructed in accordance with the present invention.

FIG. 1 shows the functionality to be achieved by an optical switching fabric constructed in accordance with the present invention. A wavelength division multiplexed (WDM) optical signal is received on one of the ports $69_1, 69_2, \ldots 69_n$. Ports $69_1, 69_2, \ldots 69_n$ are bi-directional ports and therefore each can serve as input or output ports. Optical switching fabric 62 is designed to direct the individual wavelength components of the WDM signal from the receiving port to any select ones of the ports $69_1, 69_2, \ldots 69_n$, including the port that initially received the optical signal. That is, switching fabric 62 can selectively direct any wavelength component from any input port to any other port, independent of the routing of the other wavelengths. Accordingly, in contrast to other switching fabrics, this switching fabric does not have two distinct subsets of ports, one serving as input ports and the other serving as output ports.

It should be noted that the term wavelength component as used herein should not only be construed as limited to a single wavelength. Rather, the term wavelength component may also refer to a band of wavelengths. That is, a wavelength component can refer to a single wavelength or a waveband (such as provided by a contiguous set of channels) which defines a subset of the total waveband encompassed by the WDM optical signal.

Figure 2:
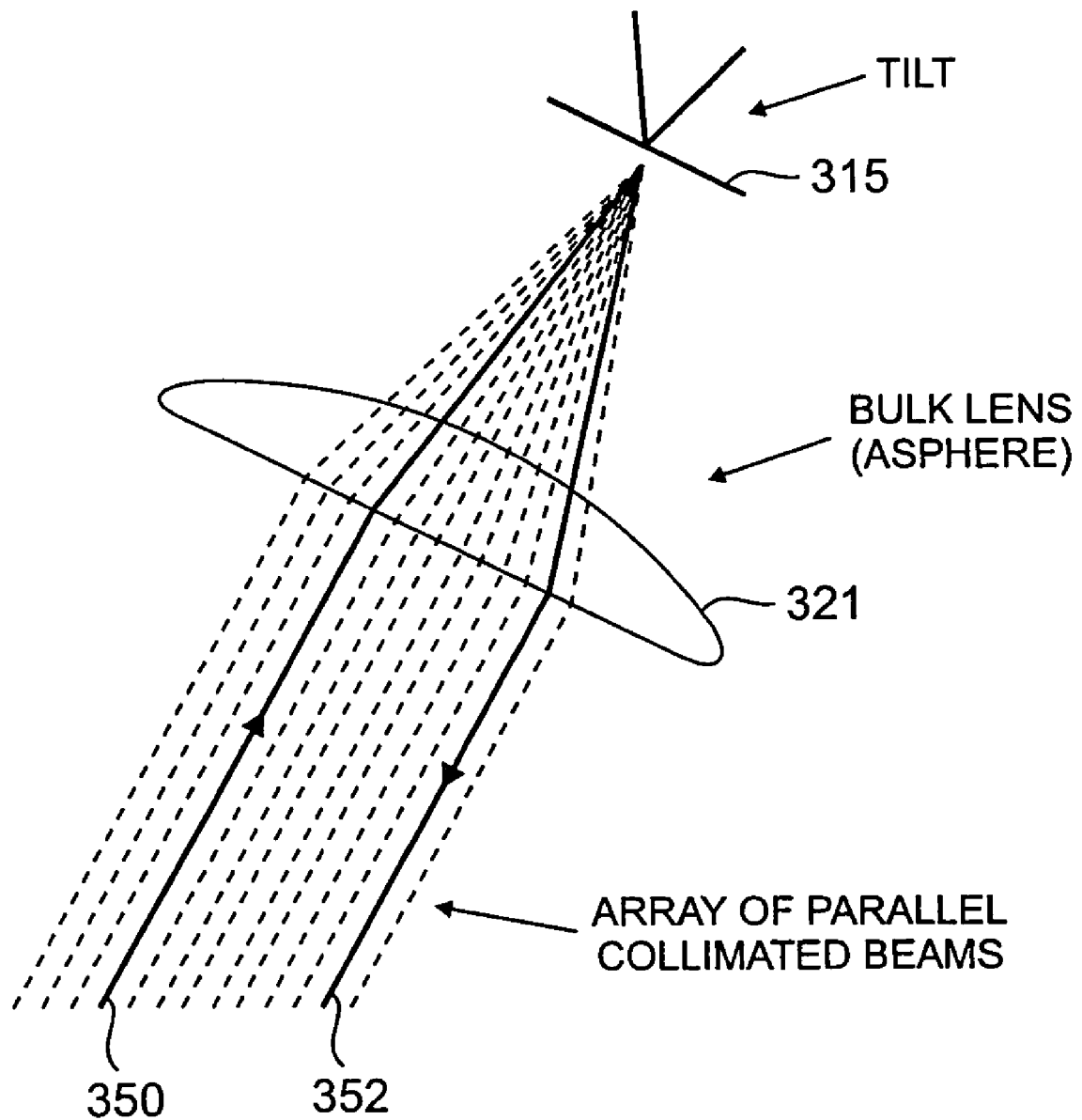
FIG. 2 illustrates a broadband, wavelength-independent optical switch constructed in accordance with the present.

FIG. 2 illustrates a broadband, wavelength-independent embodiment of the invention. In FIG. 2, lens 321 and tiltable mirror 315 act as an assembly to retroreflect an incoming beam 350 received from an array of ports (not shown), each of which may comprise a collimating lens and an optical fiber. The spatial location of the retroreflected beam 352, which is parallel to incoming beam 350, is determined by the tilt angle of the mirror 315. As is evident from FIG. 2, an incoming beam received from a given port can be directed to any other port. Notably, if the mirror 315 is tilted so that incoming and retroreflected beams 350 and 352 are coincident, the incoming beam can even be directed back to the port from which it originated.

It should be appreciated that although in FIG. 2 tilt and translation is only shown in one dimension within the plane of the page, two dimensional switching can be achieved by further tilting the mirror into or out of the page. Additional details concerning the tiltable mirrors will be provided below in connection with the embodiment of the invention shown in FIG. 3.

Figure 3:
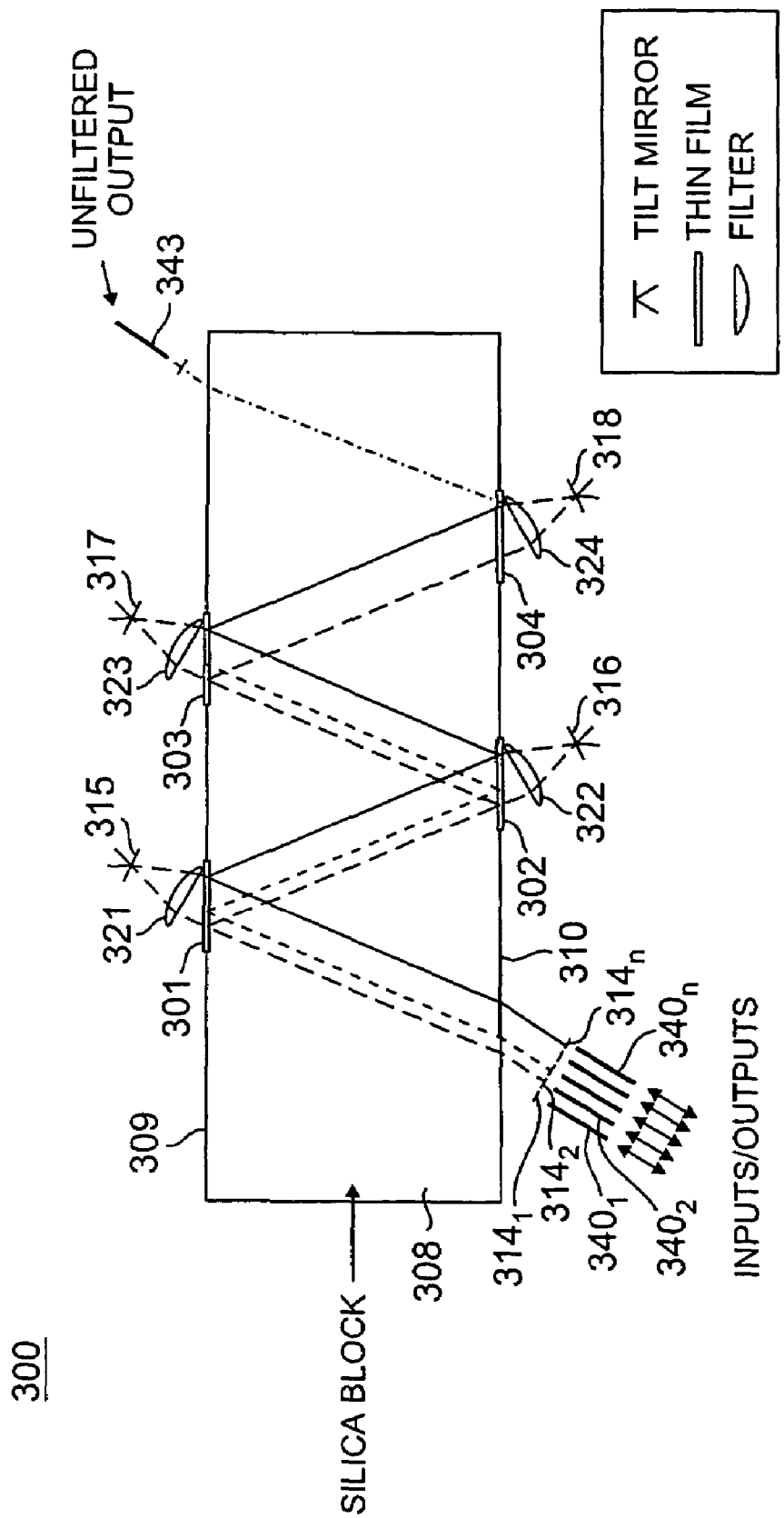
FIG. 3 illustrates a wavelength-dependent optical switch constructed in accordance with the present invention.

FIG. 3 illustrates a second, wavelength dependent embodiment of the invention. In FIG. 3, the optical switching element 300 comprises an optically transparent substrate 308, a plurality of dielectric thin film filters 301, 302, 303, and 304, a plurality of collimating lens 321, 322, 323, and 324, a plurality of tiltable mirrors 315, 316, 317, and 318 and a plurality of ports $340_1, 340_2, \ldots 340_n$. Substrate 308 has parallel planar surfaces 309 and 310 on which first and second filter arrays are respectively arranged. The first filter array is composed of thin film filters 301 and 303 and the second filter array is composed of thin film filters 302 and 304. Individual ones of the collimating lenses 321-324 and tiltable mirrors 315-318 are associated with each of the thin film filters. Each thin film filter, along with its associated collimating lens and tiltable mirror, effectively forms a narrow band, free space switch, i.e. a switch that routes individual wavelength components along different paths. The overall physical dimensions of switching element 300 will be determined in part by the beam diameter of the WDM signal.

Thin film filters 301-304 are well-known components (for example, see U.S. Pat. No. 5,583,683), which have a dielectric multilayer configuration. The thin film filters 301-304 have a wavelength dependent characteristic, that is, their reflectivity and transmissivity depends on the wavelength of light. In particular, among the wavelength components of the WDM optical signal received by thin film filter 301, only the component with wavelength $\lambda_1$ is transmitted therethrough. The remaining wavelength components are all reflected by thin film filter 301. Likewise, thin film filter 302 transmits only the component with wavelength $\lambda_2$ and reflects all other wavelengths. In the same manner, the thin film filters 303 and 304 transmit components with wavelengths $\lambda_3$ and $\lambda_4$, respectively, and reflect all other wavelengths. Thus, the present invention demultiplexes wavelengths through a plurality of thin film filters with different pass bands.

The tiltable mirrors 315-318 are any mirrors that can be precisely tilted on 2 axes, and which preferably are very small and reliable with a flatness better than about $\lambda/20$. The exemplary mirrors discussed herein are supported by one or more flexure arms that employ a micro-electromechanical system (MEMS). Actuation of the flexure arms tilts the mirror surface to alter the direction of propagation of an incident beam of light. Examples of such micro-electromechanical mirrors are disclosed in U.S. Pat. No. 6,028,689 and the references cited therein. Of course, other mechanisms may be alternatively employed to control the position of the mirrors, such as piezoelectric actuators, for example.

In operation, a WDM optical signal composed of different wavelengths $\lambda_1, \lambda_2, \lambda_3$ and $\lambda_4$ is directed from one of the ports $340_1, 340_2, \ldots 340_n$ to the collimator lens $314_1, 314_2, \ldots 314_n$ associated with that port. The WDM signal traverses substrate 308 and is received by thin film filter 301. According to the characteristics of the thin film filter 301, the optical component with wavelength $\lambda_1$ is transmitted through the thin film filter 301, while the other wavelength components are reflected and directed to thin film filter 302 via substrate 308. The wavelength component $\lambda_1$, which is transmitted through the thin film filter 301, is converged by the collimating lens 321 onto the tiltable, reflective mirror 315. Analogous to the embodiment of the invention shown in FIG. 2, tiltable mirror 315 is positioned so that wavelength component $\lambda_1$, which is received by the collimating lens 321 along path 350, is retroreflected from the mirror 315 to a selected one of the ports $340_1$-$340_n$ via path 352. Optical path 352 is offset from optical path 350 so that wavelength component $\lambda_1$ is directed to the desired port. The particular port that is selected to receive the wavelength component will determine the particular orientation of the mirror 315. If optical paths 350 and 352 are coincident, wavelength component $\lambda_1$ will be directed back to the port from which it originated.

As mentioned, the remaining wavelength components $\lambda_2$, $\lambda_3$, and $\lambda_4$ are reflected by thin film filter 301 back into substrate 308 and directed to thin film filter 302. Wavelength component $\lambda_2$ is transmitted through thin film filter 302 and lens 322 and retroreflected to a selected port by tiltable mirror 316 via thin film filter 301, which reflects wavelength component $\lambda_2$. Similarly, all other wavelength components are separated in sequence by the thin film filters 303-304 and subsequently reflected by tiltable mirrors 317-318 to selected ports. By appropriate actuation of the tiltable mirrors, each wavelength component can be directed to a port that is selected independently of all other wavelength components. Any wavelengths that have not been redirected by any of the tiltable mirrors may be received by an optional bypass port or fiber 343. Although the embodiment of FIG. 3 is configured to selectively switch four wavelengths, it will be recognized that the invention more generally may selectively switch any number of wavelengths by employing a corresponding number of narrow band, free space switches.

A number of important advantages are achieved by the embodiment of the invention shown in FIG. 3. For example, there is no need to designate a set of input ports that are distinct from a set of output ports. Rather, each of the ports can simultaneously serve as an input port or an output port. Additionally, because free space switching is employed, the number of optical connections is kept to a minimum, reducing the insertion loss, complexity and cost of the device.

The following description sets forth for illustrative purposes only one particular example of the embodiment of the invention shown in FIG. 3. In this example, the substrate is a rectangular silica block having a thickness of 12 mm, a width of 11.475 mm and a length of 32 mm. A 2×10 array of collimated beams is oriented at an angle of 11.56° with respect to the normal to the block. The array is properly oriented by rotating the beams along an axis parallel to the long dimension of the block to form the desired angle between the block and the array. Individually collimated single fiber output ports are aligned so that the beams in the array are parallel to one another. The focal length of the collimating lenses in the array is chosen such that light exiting a Corning SMF-28™ fiber and passing through a single lens results in an optical beam with a width of 0.45 mm and a Gaussian waist located 72 mm from the lens. The fiber ends are polished flat and have an anti-reflective coating.

The first and second array of narrow band free-space switches each include eight thin film filters. The thin film filters are each a three-cavity resonant thin film filter with a radius of curvature of the filter surface >100 m and dimensions of 3.2 mm by 11.2 mm. In the first array, the first thin film filter, which is located 3.2 mm from the edge of the substrate, is bonded with optical-quality, index matching epoxy to the substrate and has a passband centered at 194.0 THz (1545.32 nm). The optical passband is nominally 0.4 nm wide at −0.5 dB down from the peak, with an isolation of better than −15 dB starting 0.8 nm from the center wavelength. A 12 mm focal length aspheric lens is bonded to the thin film filter. A commercially available, micro-electro-mechanical (MEMS) tiltable mirror is then positioned at the focal point of the lens. Voltages can be applied to the tiltable mirror to vary its angular orientation along two axes. The angles over which the mirror is adjusted typically do not exceed 20°.

The first array also includes a second narrow band free-space switch located 3.23 mm from the first free-space switch. The thin film filter employed in this switch has a center optical wavelength of 193.8 THz (1546.92 nm). Six additional narrow band free-space switches are located along the substrate, which have center wavelengths of 1548.52 nm, 1550.12 nm, 1551.72 nm, 1553.32 nm, 1554.92 nm, and 1556.52 nm, respectively. The center-to-center distance between each subsequent switch is 3.23 mm.

The second array of narrow band free space switches is located on the substrate surface opposing the substrate surface on which the first array of switches is located. The second array of switches, which are also located 3.23 mm apart from one another, are laterally oriented half way between the first array of switches. The eight thin film filters employed in the second array of switches have center pass band wavelengths of 1544.52 nm, 1546.12 nm, 1547.72 nm, 1549.32 nm, 1550.92 nm, 1552.52 nm, 1554.12 nm, and 1555.72 nm, respectively.

Each individual tiltable mirror has an electronics circuit to which a voltage is applied to steer the mirror. The voltage necessary to steer the mirror so that the wavelength it reflects is directed to a particular output fiber will differ from mirror to mirror. The operating voltages (typically over a −60 to +60 volt range) for steering the mirror are chosen to maximize the optical power coupled into the desired output fiber.

One of ordinary skill in the art will recognize that each of the narrow band free space switches shown in FIG. 3 do not necessarily require a single lens and mirror combination to perform retroreflection. Rather, other combinations of optical elements may be used to properly redirect the wavelength components. For example, two tiltable mirrors may be arranged to achieve the same result without the use of a lens. Alternatively, a single mirror may be used if in addition to being tiltable along two axes its position can also undergo a spatial translation. This invention may employ any free space switch configuration that can retroreflect the beam with sufficient translation to access the desired fiber ports.

It is often important to monitor the presence and intensity of each individual wavelength component received by the switch shown in FIG. 3. This can become particularly difficult using conventional fiber monitoring taps when the WDM signal includes a large number of wavelength components. In the present invention, this problem may be readily overcome since only a single wavelength component is received by each of the tiltable mirrors. Accordingly, individual wavelength components may be monitored by placing a detector behind the mirror so that it receives the small portion of the power of the wavelength component that passes through the mirror. This information combined with conventional tap monitoring can provide network control and administration a more complete monitoring picture of light routed through the switch.

It is also important to maintain accurate alignment between the tiltable mirrors in their various positions and the input and output fibers to optimize the power they receive from the mirrors. This can be accomplished by slow adjustment of the mirrors while monitoring the power coupled to the fiber via conventional fiber monitoring taps. However this approach becomes complicated if many other wavelengths are present on the fiber, in which case it may be useful to improve the detection of each wavelength component by encoding a small amplitude modulation with a unique RF frequency that is detected at the respective output fibers while adjusting the positions of the tiltable mirrors. This RF tone can be encoded at the transmitter with a unique tone for every wavelength, or alternately the RF amplitude modulation can be temporarily encoded during mirror adjustment by providing a small oscillation of the mirror tilt that slightly changes the coupling efficiency to the fiber. The latter approach is beneficial in tones that are encoded where they are measured, eliminating the need to track them throughout the network, and additionally, the tones are only encoded when they are needed for adjustments.

Another embodiment of the invention will now be described with reference to FIGS. 1 and 4. Similar to the embodiment shown in FIGS. 2 and 3, this embodiment has no predefined input or output ports. Unlike the embodiments in FIGS. 2 and 3, however, this embodiment employs conventional 1×M optical switches and multiplexers. Referring to FIG. 1, a WDM signal is received on any of the input/output ports $69_1, 69_2, \ldots 69_n$ and is demultiplexed into individual wavelength components or channels output onto individual fibers using conventional demultiplexers $67_1, 67_2, \ldots 67_n$. Such demultiplexers are well known and can be fabricated from any of several different technologies, including, but not limited to, thin film dielectric filters and arrayed waveguide gratings in silica optical waveguides. Each individual switching fabric $65_1, 65_2, \ldots 65_n$ receives the same wavelength component from all of the demultiplexers $67_1, 67_2, \ldots 67_n$. For the given wavelength component that it receives, the switching fabric can establish a bi-directional optical connection between any two of the input/output ports $69_1, 69_2, \ldots 69_n$, thereby enabling an incoming signal to be directed from the switching fabric to any of the demultiplexers $67_1, 67_2, \ldots 67_n$. The demultiplexers will in turn multiplex the signal with any other wavelength components received from the other switching fabrics $65_1, 65_2, \ldots 65_n$. If an independent switching fabric is available for each and every individual wavelength component or channel, any component of a WDM signal can be routed between any of the input/output ports $69_1, 69_2, \ldots 69_n$, independent of the routing of the other components.

Figure 4:
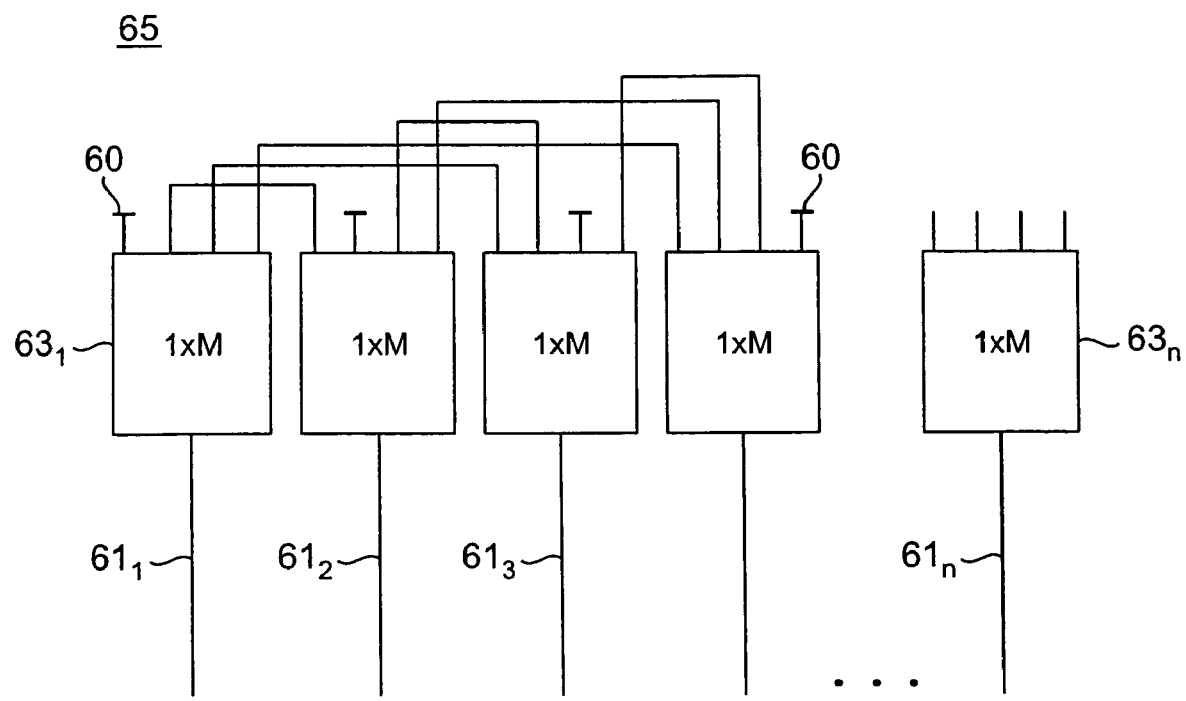
FIG. 4 illustrates an optical switching fabric constructed of conventional 1×M switches to perform the functionality depicted in FIG. 1.

FIG. 4 shows an example of one of the switching fabrics $65_1, 65_2, \ldots 65_n$. In FIG. 4, an incoming wavelength from any of the input/output ports enters the unique input port $61_1, 61_2, \ldots 61_n$ of one of the conventional 1×M switches $63_1, 63_2, \ldots 63_n$. All but one the M output ports of switches $63_1, 63_2, \ldots 63_n$ are connected to each of the other 1×M switches. The remaining output port of each switch $63_1, 63_2, \ldots 63_n$ is coupled to a mirror 60 that reflects the wavelength back to the input port of that switch. Since a connection can be made in this fashion between any two desired 1×M switches, optical signals can clearly be routed between any two input ports $61_1, 61_2, \ldots 61_n$ of the switching fabric, including reflection out the incoming port. An incoming wavelength received on the input port of any given 1×M switch can be routed by that given switch to a desired one of the input/output ports $69_1, 69_2, \ldots 69_n$ (FIG. 1) by establishing a connection from the given 1×M switch to the 1×M switch connected to the demultiplexer associated with the desired input/output port. The demultiplexer, in turn, will multiplex the wavelength onto the desired input/output port.

Figure 5:
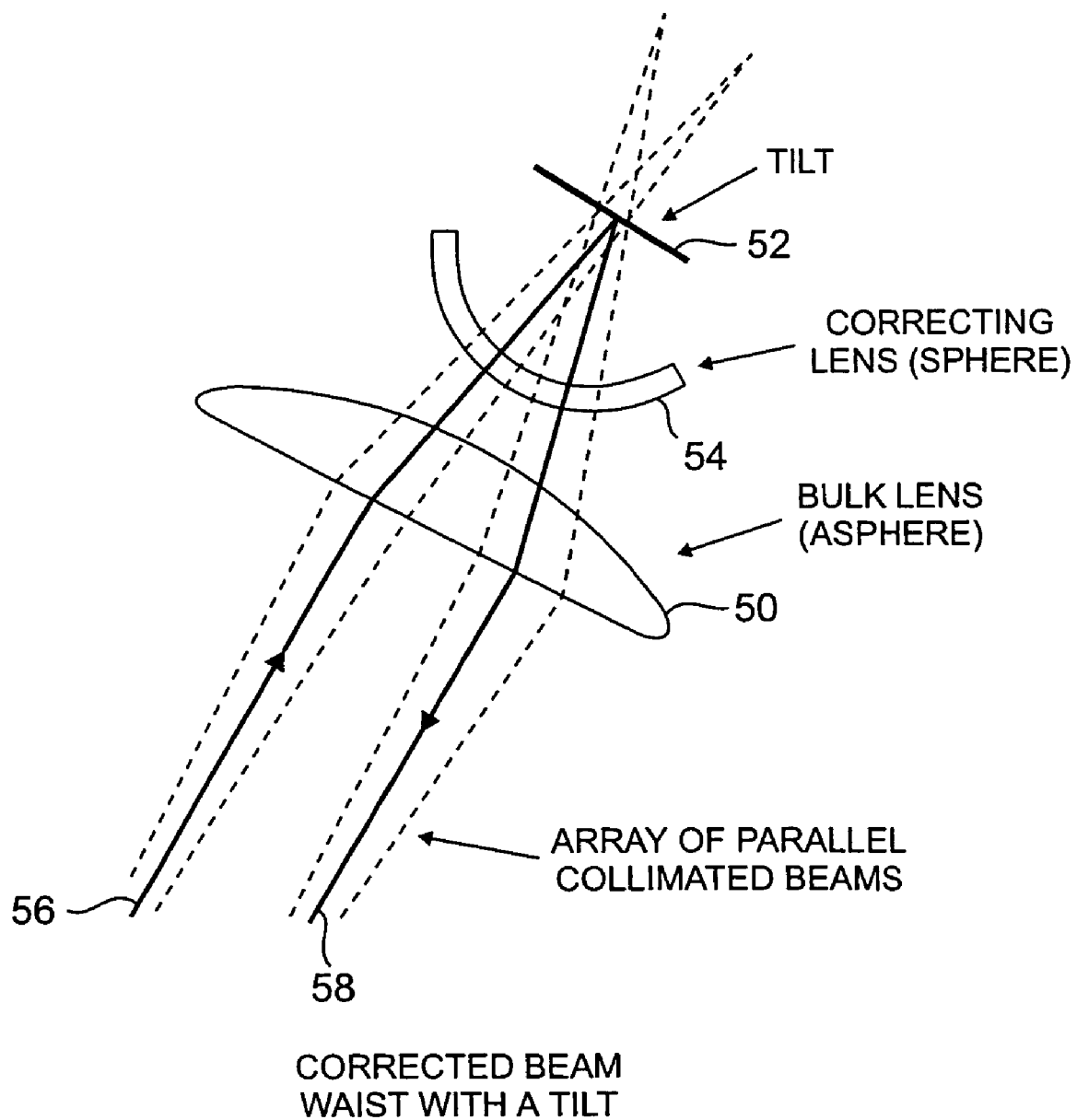
FIG. 5 shows an embodiment of the invention similar to that shown in FIG. 2 but which employs a correcting lens to enable the switching of expanded beams with minimal insertion loss.
Figure 6:
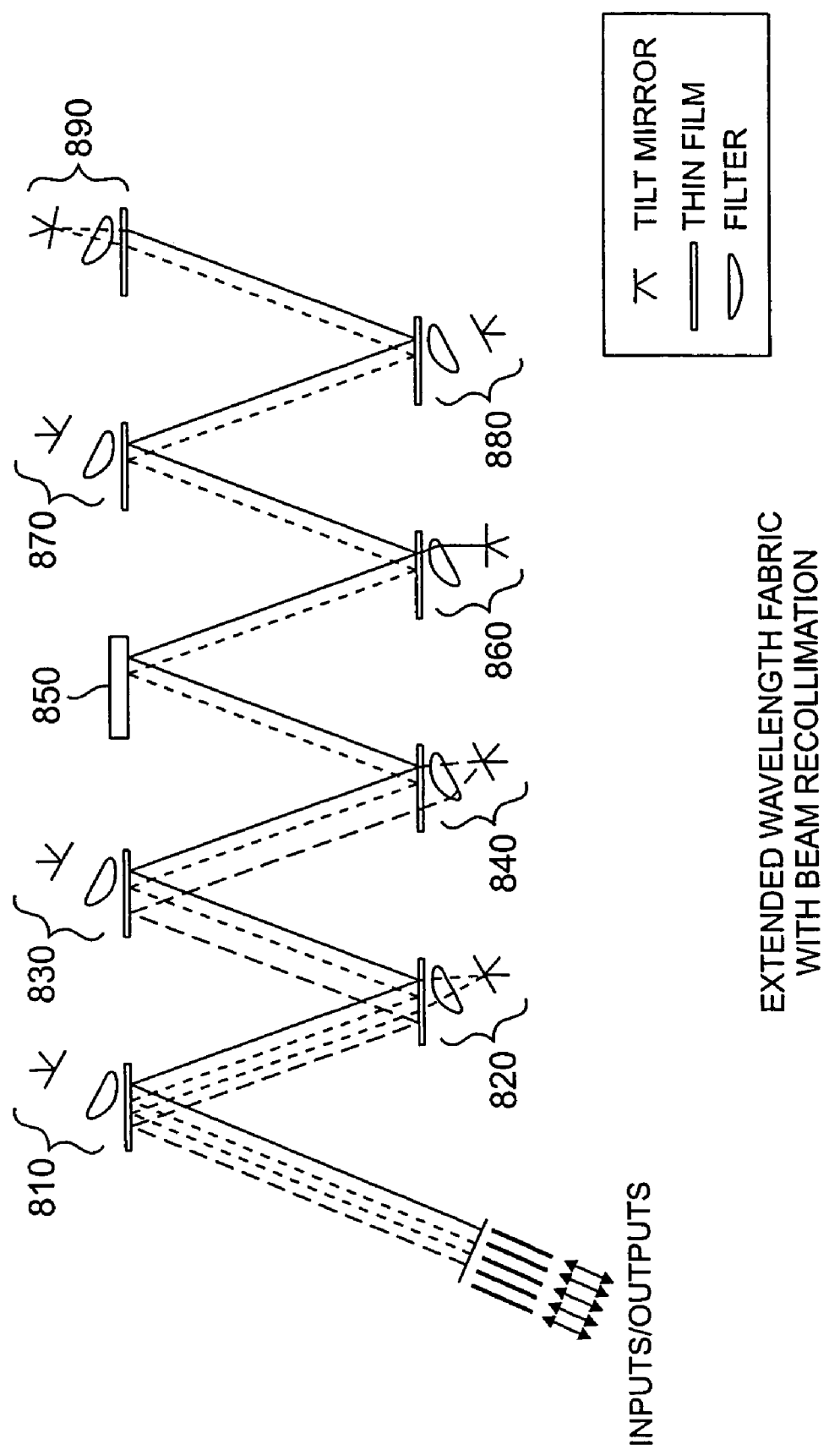
FIG. 6 shows an alternative embodiment of the invention shown in FIG. 5 in which a focusing mirror is used to reduce insertion loss.

Returning to the embodiments of the invention shown in FIGS. 2 and 3, in some circumstances an optical beam entering the switches of FIG. 2 or 3 is not adequately collimated. As a result, a free space switch (whether broad band or narrow band) formed from a simple aspheric lens and a tiltable mirror located at the focal plane of the lens will introduce insertion loss when the switch directs light back to one of the input/output ports. This loss arises because while a beam received from any given port will cross the optical axis of the aspheric lens at the focal point, its beam waist will not be located in the focal plane. As shown in FIG. 5, a correcting optic 54 can be inserted between the aspheric lens 50 and the tiltable mirror 52 to minimize this contribution to the insertion loss. The correcting optic 54 may be, for example, a convex-concave lens with surfaces having a spherical radius of curvature equal to the distance from the surface to the tiltable mirror 52. In this manner, the correcting optic 54 does not steer an optical beam, but simply changes the position of its beam waist. In this way it is possible to locate the waist of every beam in the focal plane while ensuring that each beam crosses the optical axis in the focal plane. Alternatively, instead of incorporating correcting optic 54 into each of the free space switches, one of the free space switches may be replaced with a focusing mirror. For example, as shown in FIG. 6, optical element 850 is an array of focusing mirrors rather than a free space switch. While focusing element 850 is shown located in the optical path between free space switches 840 and 860, the element 850 more generally may be located in the optical path between different ones of the free space switches. Focusing element 850 adjusts the location of the beam waist to maintain the collimation of relatively small beams in the switching fabric within their Rayleigh range. Maintaining this level of collimation in turn obviates the need for the focal point correction as discussed in connection with FIG. 5.

Figure 8:
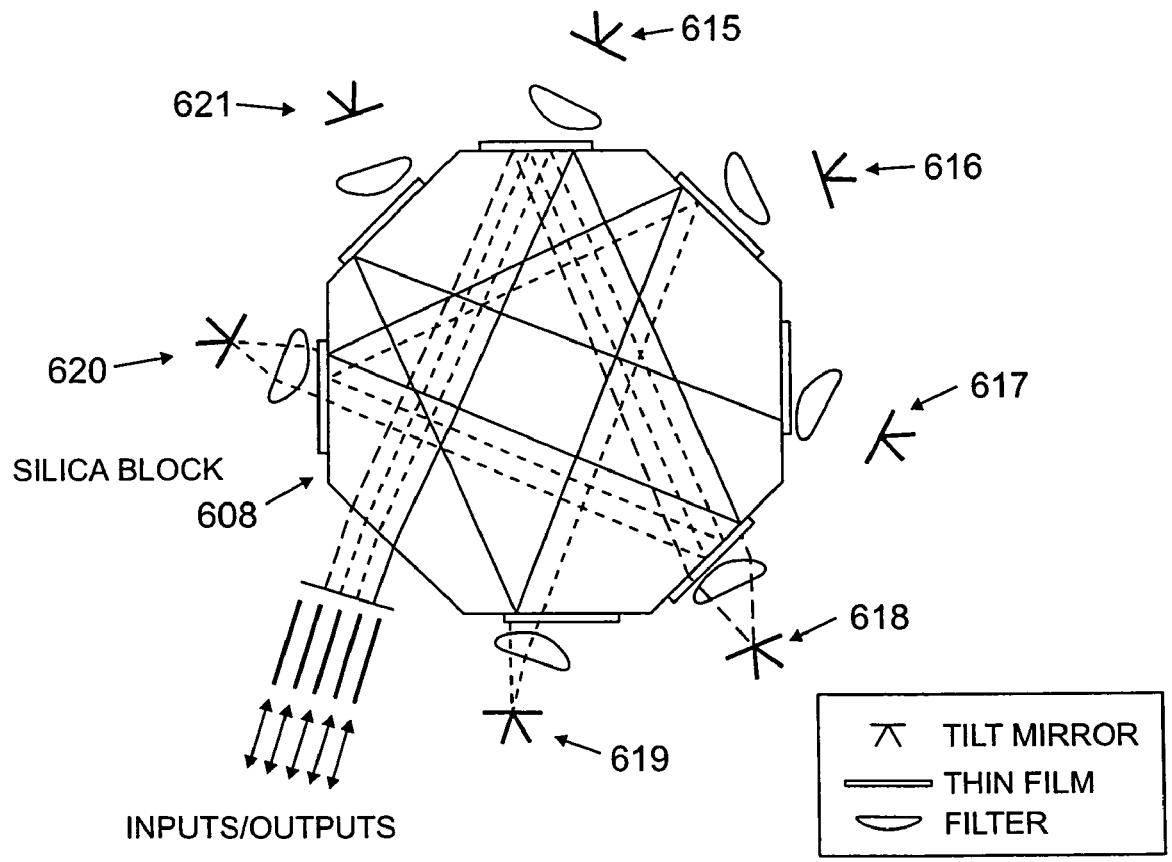
FIG. 8 shows an alternative embodiment of the invention in which the optically transparent substrate is arranged in a hexagonal configuration.

FIG. 8 shows one alternative embodiment of the invention in which optically transparent substrate 608 is arranged in a nearly circular configuration. Of course, as with the previous embodiments of the invention, the substrate 608 may be ambient air, silica glass, or some other optically transparent medium. In this way each of the tiltable mirrors 615-621 may be arranged in a circular configuration about the substrate 608. One advantage of this arrangement is that the distance between each tiltable mirror can be increased relative to the distance between each tiltable mirror in the embodiment of the invention shown in FIG. 3. Since more space is now available, the additional distance provides more flexibility in the configuration of the packaging that houses the tiltable mirrors. For example, the extra space may allow off-the-shelf tiltable mirror packages to be employed without being customized to reduce their size.

Figure 7:
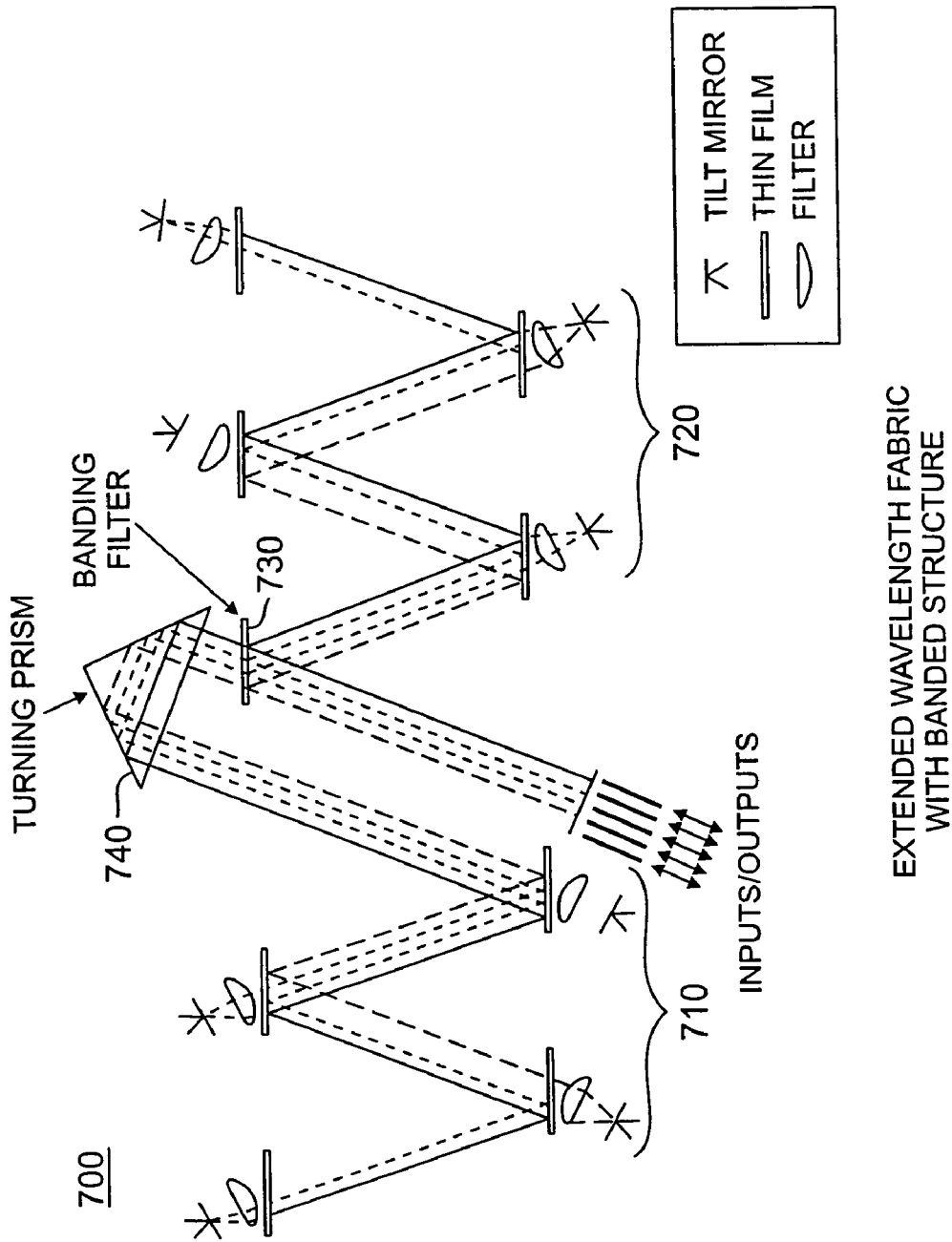
FIG. 7 shows another alternative embodiment of the invention.

FIG. 7 shows another alternative embodiment of the invention in which two or more individual ones of the inventive optical switches 300 shown in FIG. 3 are used to provide an extended-wavelength switch 700 that can route more wavelength components than either of the individual switches 300. This may be an advantageous way to extend the wavelength capabilities of an individual switch fabric to avoid the collimation problems discussed in connection with FIG. 5 and FIG. 8. In particular, if individual switch 710 is configured to route wavelengths $\lambda_1$-$\lambda_8$ and individual switch 720 is configured to route wavelengths $\lambda_9$-$\lambda_{16}$, then the extended-wavelength switch 700 can route wavelengths $\lambda_1$-$\lambda_{16}$ in the same manner as an individual switch 300 that is configured to route wavelengths $\lambda_1$-$\lambda_{16}$. In addition to individual switches 710 and 720, extended wavelength switch 700 includes a banding filter 730 and prism 740. Filter 730 may be a thin film filter similar to thin film filters 301-304 shown in FIG. 3. Filter 730 is configured so that it transmits wavelength components $\lambda_1$-$\lambda_8$ and reflects wavelength components $\lambda_9$-$\lambda_{16}$. Filter 730 is positioned to receive a WDM signal from input/output ports $740_1, 740_2, \ldots 740_n$. Accordingly, wavelength components $\lambda_9$-$\lambda_{16}$ are reflected to switch 720, which routes the components in the same manner as discussed in connection with FIG. 3. Likewise, wavelength components $\lambda_1$-$\lambda_8$ are transmitted through banding filter 730 and reflected by prism 740 in accordance with the principles of total internal reflection to switch 710. While FIG. 7 shows an extended-wavelength switch formed from two individual switches 300 transited in parallel, those or ordinary skill in the art will recognize that any number of individual switches 300 may be concatenated in a similar manner to route any desired number of wavelength components.

The invention claimed is:

1. An optical switch comprising:
   a plurality of input/output ports for receiving one or more wavelength component(s) of an optical signal; and
   an optical arrangement directing said wavelength component to any given one of the plurality of input/output ports, said given input/output port being variably selectable from among any of the plurality of input/output ports,
   wherein the optical switch has the ability to use the same one of said plurality of input/output ports as both the input port in which a wavelength component is received and the output port through which it is directed;
   wherein said optical signal includes a plurality of wavelength components and said optical arrangement further comprises:
      at least one wavelength selective element selecting one of said wavelength components from among the plurality of wavelength components; and
      a plurality of optical elements each associated with one of the wavelength selective elements, each of said optical elements directing the selected wavelength component selected by the associated selective element to a given one of the plurality of input/output ports independently of every other wavelength component, said given input/output port being variably selectable from among any of the plurality of input/output ports;
      a free space region disposed between the input/output ports and the wavelength selective elements, wherein said free space region comprises an optically transparent substrate having first and second parallel surfaces, said plurality of wavelength selective elements being arranged in first and second arrays extending along the first and second parallel surfaces, respectively.

2. The optical switch of claim 1 wherein said optical signal is a broadband signal and said optical arrangement is wavelength-independent.

3. The optical switch of claim 1 wherein said optical arrangement retroreflects said wavelength component.

4. The optical switch of claim 2 wherein said optical arrangement retroreflects said broadband signal.

5. The optical switch of claim 1 farther comprising a free space region disposed between the input/output ports and the optical arrangement.

6. The optical switch of claim 1 wherein said wavelength selective elements are thin film filters each transmitting therethrough a different one of the wavelength components and reflecting the remaining wavelength components.

7. The optical switch of claim 6 wherein said wavelength selective elements are bulk diffraction gratings.

8. The optical switch of claim 1 wherein said optical elements are reflective mirrors that are selectively tiltable in a plurality of positions such that in each of the positions the mirrors reflect the wavelength component incident thereon to any selected one of the input/output ports.

9. The optical switch of claim 8 wherein said reflective mirrors are part of a micro-electromechanical (MEM) retroreflective mirror assembly.

10. The optical switch of claim 9 wherein said retroreflective mirror assembly includes an aspheric lens.

11. The optical switch of claim 10 wherein said retroreflective mirror assembly includes a curved reflector element.

12. The optical switch of claim 8 wherein said reflective mirrors are part of a retroreflective optical assembly.

13. The optical switch of claim 8 wherein said reflective mirrors each include a piezoelectric actuator.

14. The optical switch of claim 13 wherein the optically transparent substrate includes air as a medium in which the optical signal propagates.

15. The optical switch of claim 1 where the optically transparent substrate is silica glass.

16. The optical switch of claim 1 wherein said first and second arrays are laterally offset with respect to one another.

17. The optical switch of claim 16 wherein each of said wavelength selective elements arranged in the first array direct the selected wavelength component to another of said wavelength selective elements arranged in the second array.

18. The optical switch of claim 1 wherein the plurality of wavelength selective elements are arranged in a closed configuration.

19. The optical switch of claim 18 wherein said closed configuration is a circular configuration.

20. The optical switch of claim 18 wherein said free space region defines a polygon.

21. The optical switch of claim 1 further comprising a focusing mirror arranged in the first array, said focusing mirror reducing insertion loss by adjusting a beam waist location of the optical signal.

22. The optical switch of claim 20 wherein the free space region is ambient air.

23. The optical switch of claim 20 wherein the free space region is silica glass.

24. The optical switch of claim 1 further comprising a collimating lens disposed between each one of said wavelength selective elements and the optical element associated therewith, each of said optical elements being positioned at a focal point of the lens associated therewith.

25. The optical switch of claim 24 wherein said collimating lens and said optical element serve as a retroreflector.

26. The optical switch of claim 1 wherein said optical arrangement includes at least one collimating lens and at least one tiltable mirror.

27. The optical switch of claim 1 wherein said optical elements each include a collimating lens and a tiltable mirror.

28. The optical switch of claim 1 wherein said optical signal includes first and second pluralities of wavelength components and said optical arrangement includes first and second optical arrangement subassemblies, each of said optical arrangement subassemblies comprising:
   at least one wavelength selective element selecting one of said wavelength components from among the first or second pluralities of wavelength components; and
   a plurality of optical elements each associated with one of the wavelength selective elements, each of said optical elements directing the selected wavelength component selected by the associated selective element to a given one of the plurality of input/output ports independently of every other wavelength component, said given input/output port being variably selectable from among any of the plurality of input/output ports.

29. The optical switch of claim 28 further comprising an optical coupling arrangement directing the first plurality of wavelength components to the first optical arrangement subassembly and directing the second plurality of wavelength components to the second optical arrangement subassembly.

30. The optical switch of claim 29 wherein said optical coupling arrangement includes a filter reflecting the second plurality of wavelength components to the second optical arrangement subassembly and transmitting therethrough the first plurality of wavelength components.

31. The optical switch of claim 30 wherein said optical coupling arrangement further includes a prism receiving the first plurality of wavelength components from said filter and directing the first plurality of wavelength components to the first optical arrangement subassembly.

32. The optical switch of claim 1 further comprising a focusing mirror arranged in an optical path traversed by the optical signal between a pair of the wavelength selective elements, said focusing mirror reducing insertion loss by adjusting a beam waist location of the optical signal.

33. A method for directing at least first and second wavelength components of a WDM signal that includes a plurality of wavelength components from a first input/output port to any selected ones of a plurality of input/output ports that includes said first input/output port, said method comprising the steps of:
  (a) demultiplexing the first wavelength component from the WDM signal;
  (b) directing the first wavelength component to a given input/output port; and
  (c) demultiplexing the second wavelength component from the WDM signal and directing the second wavelength component to one of the plurality of input/output ports selected independently from the given input/output port,
wherein the method for directing has the ability to use a same one of said plurality of input/output ports as both the input port in which a wavelength component is received and the output port through which it is directed, and wherein step (c) is performed subsequent to steps (a) and (b).

34. The method of claim 33 wherein the steps of directing the first and second wavelength components include the steps of directing the first and second wavelength components through a free space region.

35. The method of claim 33 wherein the first wavelength is demultiplexed by a thin film filter having a passband corresponding to the first wavelength.

36. The method of claim 34 wherein the first wavelength component is directed through the free space region by a tiltable mirror.

37. The method of claim 36 wherein the tiltable mirror is a reflective mirror.

38. The method of claim 37 wherein said reflective tiltable mirror includes a piezoelectric actuator.

39. The method of claim 36 further comprising the step of collimating the first wavelength component onto the tiltable mirror.

40. The method of claim 33 wherein the demultiplexing and directing steps are performed by a plurality of narrow band free space switches.

41. The optical switch of claim 1 further comprising a detector associated with each of the wavelength selective elements for monitoring the wavelength component transmitted therethrough.

42. The method of claim 33 further comprising the step of monitoring the first wavelength component after performing the demultiplexing step.

43. An optical switch comprising:
  a plurality of input/output ports for receiving one or more wavelength components of a WDM signal that includes a plurality of wavelength components; and
  means for selecting one of said wavelength components from among the plurality of wavelength components and directing the selected wavelength component selected by the associated selective element to a given one of the plurality of input/output ports independently of every other wavelength component, said given input/output port being variably selectable from among any of the plurality of input/output ports,
wherein the optical switch has the ability to use the same one of said plurality of input/output ports as both the input port in which a wavelength component is received and the output port through which it is directed; and
  a free space region disposed between the input/output ports and the selecting and directing means, wherein said free space region comprises an optically transparent substrate having first and second parallel surfaces, said selecting and directing means including a plurality of wavelength selective elements arranged in first and second arrays extending along the first and second parallel surfaces, respectively.

44. The optical switch of claim 43 wherein said selecting and directing means comprises a plurality of narrow band free space switches.

45. The optical switch of claim 43 wherein said selecting and directing means comprises a wavelength selective element and an optical element associated therewith.

46. The optical switch of claim 45 wherein said wavelength selective element is a thin film filter.

47. The optical switch of claim 44 wherein said narrow band free space switch includes a thin film filter and a tiltable optical element.

48. The optical switch of claim 47 wherein said tiltable optical element is a tiltable mirror.

49. The optical switch of claim 45 wherein said wavelength selective element is a bulk diffraction grating.

50. The optical switch of claim 33 further comprising a detector associated with each of the narrow band free space switches.

51. The optical switch of claim 43 wherein the free space region comprises air as a medium in which the optical signal propagates.

52. The optical switch of claim 43 wherein the optically transparent substrate is silica glass.

53. The optical switch of claim 43 wherein said first and second arrays are laterally offset with respect to one another.

54. The optical switch of claim 53 wherein each of said wavelength selective elements arranged in the first array direct the selected wavelength component to another of said wavelength selective elements arranged in the second array.

55. The optical switch of claim 45 wherein said optical element is a retroreflector.

56. The optical switch of claim 47 wherein said tiltable optical element includes a tiltable mirror and a collimating lens.

57. The optical switch of claim 26 further comprising a correcting optical element disposed between the collimating lens and said tiltable mirror for reducing insertion loss.

58. The optical switch of claim 57 wherein said optical element is a tiltable mirror and said correcting optical element is a convex-concave lens.

59. The optical switch of claim 58 wherein at least one surface of said convex-concave lens has a spherical radius of curvature substantially equal to a distance between a surface of the lens and the tiltable mirror.

60. The optical switch of claim 56 further comprising a correcting optical element disposed between the collimating lens and said tiltable mirror for reducing insertion loss.

61. The optical switch of claim 60 wherein said correcting optical element is a convex-concave lens.

62. The optical switch of claim 61 wherein said convex-concave lens has a spherical radius of curvature substantially equal to a distance between at least one surface of the lens and the tiltable mirror.

\* \* \* \* \*